United States Patent
Ballot et al.

(10) Patent No.: US 9,854,503 B2
(45) Date of Patent: Dec. 26, 2017

(54) PREVENTION OF CONGESTION AT RADIO ACCESS IN A MOBILE OR WIRELESS COMMUNICATION SYSTEM

(75) Inventors: Jean-Marc Ballot, Nozay (FR); Laurent Thiebaut, Nozay (FR)

(73) Assignee: GEMALTO SA, Meudon (FR)

( * ) Notice: Subject to any disclaimer, the term of this patent is extended or adjusted under 35 U.S.C. 154(b) by 471 days.

(21) Appl. No.: 13/500,261

(22) PCT Filed: Oct. 1, 2010

(86) PCT No.: PCT/EP2010/064667
§ 371 (c)(1),
(2), (4) Date: Jun. 20, 2012

(87) PCT Pub. No.: WO2011/042370
PCT Pub. Date: Apr. 14, 2011

(65) Prior Publication Data
US 2012/0257504 A1    Oct. 11, 2012

(30) Foreign Application Priority Data
Oct. 8, 2009  (EP) .................................. 09305957

(51) Int. Cl.
*H04W 48/06* (2009.01)
*H04W 4/00* (2009.01)
(Continued)

(52) U.S. Cl.
CPC ............. *H04W 48/06* (2013.01); *H04L 67/12* (2013.01); *H04W 4/00* (2013.01); *H04W 4/005* (2013.01); *H04W 4/08* (2013.01); *H04W 8/186* (2013.01)

(58) Field of Classification Search
CPC ....... H04W 48/06; H04W 4/00; H04W 4/005; H04W 4/08; H04W 8/186; H04L 29/08558; H04L 67/12
See application file for complete search history.

(56) References Cited

U.S. PATENT DOCUMENTS 5,361,396 A *  11/1994 Onoe et al. ................. 455/435.1
6,044,069 A *   3/2000 Wan ............................. 370/311
(Continued)

FOREIGN PATENT DOCUMENTS

CN       1349725 A       5/2002
JP       8317471 A      11/1996
(Continued)

OTHER PUBLICATIONS

"Digital cellular telecommunications system (Phase 2+); Universal Mobile Telecommunications System (UMTS); LTE; Priority service feasibility study (3GPP TR 22.950 version 8.0.0 Release 8)," European Telecommunications Standards Institute (ETSI), vol. 3-SA1, No. V8.0.0, XP014042773, 36 pages, Jan. 1, 2009.
(Continued)

*Primary Examiner* — Rina Pancholi
(74) *Attorney, Agent, or Firm* — Fay Sharpe LLP

(57) ABSTRACT

In one aspect, there is provided is a method for preventing congestion at radio access in a mobile or wireless communication system, said method comprising, in an embodiment, a step of:
 barring a Mobile Terminal from radio access, except if said Mobile Terminal belongs to a given one of different ranges into which Mobile Terminals are split, said given range being referred to as allowed range, said allowed range changing upon time.

22 Claims, 2 Drawing Sheets

(51) Int. Cl.
*H04W 4/08* (2009.01)
*H04W 8/18* (2009.01)
*H04L 29/08* (2006.01)

(56) References Cited

U.S. PATENT DOCUMENTS

| | | | | |
|---|---|---|---|---|
| 6,366,780 | B1* | 4/2002 | Obhan | H04W 16/00 370/329 |
| 6,438,375 | B1* | 8/2002 | Muller | H04W 52/0216 340/7.33 |
| 6,741,605 | B1* | 5/2004 | Vanhoof et al. | 370/447 |
| 7,774,008 | B2* | 8/2010 | Benaouda | G01D 4/004 370/349 |
| 8,077,677 | B2 | 12/2011 | Wang et al. | |
| 8,219,090 | B2* | 7/2012 | Hosain | H04W 48/18 455/432.1 |
| 2004/0176066 | A1* | 9/2004 | Binzel | H04W 76/007 455/404.1 |
| 2004/0209623 | A1* | 10/2004 | Sauter et al. | 455/453 |
| 2006/0203766 | A1* | 9/2006 | Kim et al. | 370/328 |
| 2008/0032714 | A1* | 2/2008 | Suzuki | H04W 4/16 455/458 |
| 2008/0045262 | A1* | 2/2008 | Phan | H04W 36/0083 455/525 |
| 2010/0057485 | A1* | 3/2010 | Luft | H04W 4/00 455/411 |
| 2010/0112976 | A1* | 5/2010 | Turina | H04W 4/22 455/404.1 |
| 2010/0130218 | A1* | 5/2010 | Zhang | H04W 48/12 455/450 |
| 2010/0197294 | A1* | 8/2010 | Fox et al. | 455/422.1 |
| 2010/0267391 | A1* | 10/2010 | Schmitt | 455/445 |
| 2011/0098020 | A1 | 4/2011 | Van Loon et al. | |
| 2011/0199905 | A1* | 8/2011 | Pinheiro | H04W 4/005 370/235 |

FOREIGN PATENT DOCUMENTS

| | | |
|---|---|---|
| JP | 2001224073 A | 8/2001 |
| JP | 2007-235224 A | 9/2007 |
| JP | 2007227996 A | 9/2007 |
| JP | 2007-295249 A | 11/2007 |
| JP | 2009049543 A | 3/2009 |
| JP | 2010517478 A | 5/2010 |
| JP | 2011514063 A | 4/2011 |
| WO | WO 00/52948 A1 | 9/2000 |
| WO | 02/17671 A1 | 2/2002 |
| WO | WO/2009074186 * | 6/2009 |

OTHER PUBLICATIONS

International Search Report for PCT/EP2010/064667 dated Dec. 6, 2010.
English Bibliography for Japanese Patent Application Publication No. JP2007227996A, published Sep. 6, 2007, printed from Thomson Innovation on Jan. 16, 2014; 3 pp.
English Bibliography for Japanese Patent Application Publication No. JP2009049543A, published Mar. 5, 2009, printed from Thomson Innovation on Jan. 16, 2014; 3 pp.
English Bibliography for Japanese Patent Application Publication No. JP2010517478A, published May 20, 2010, printed from Thomson Innovation on Jan. 16, 2014; 4 pp.
English Bibliography for Japanese Patent Application Publication No. JP2011514063A, published Apr. 28, 2011, printed from Thomson Innovation on Jan. 16, 2014; 5 pp.
English Bibliography for Chinese Patent Application Publication No. CN1349725A, published May 15, 2002, printed from Thomson Innovation on Dec. 16, 2014; 5 pp.
English Bibliography for Japanese Patent Application Publication No. JP8317471A, published Nov. 29, 1996, printed from Thomson Innovation on Dec. 16, 2014; 3 pp.
English Bibliography for Japanese Patent Application Publication No. JP2001224073A, published Aug. 17, 2001, printed from Thomson Innovation on Dec. 16, 2014; 3 pp.
PCT Pat. App. No. PCT/EP2010/064667, Written Opinion of the International Searching Authority, dated Apr. 20, 2010, 6 pp.
European Pat. App. No. 09305957.4, Extended European Search Report, dated May 19, 2010, 7 pp.
English Bibliography for Japanese Patent Application Publication No. JP2007235224A; published Sep. 13, 2007; printed from Thomson Innovation on Jun. 13, 2016; 3 pp.
English Bibliography for Japanese Patent Application Publication No. JP2007295249A; published Nov. 8, 2007; printed from Thomson Innovation on Jun. 13, 2016; 4 pp.

* cited by examiner

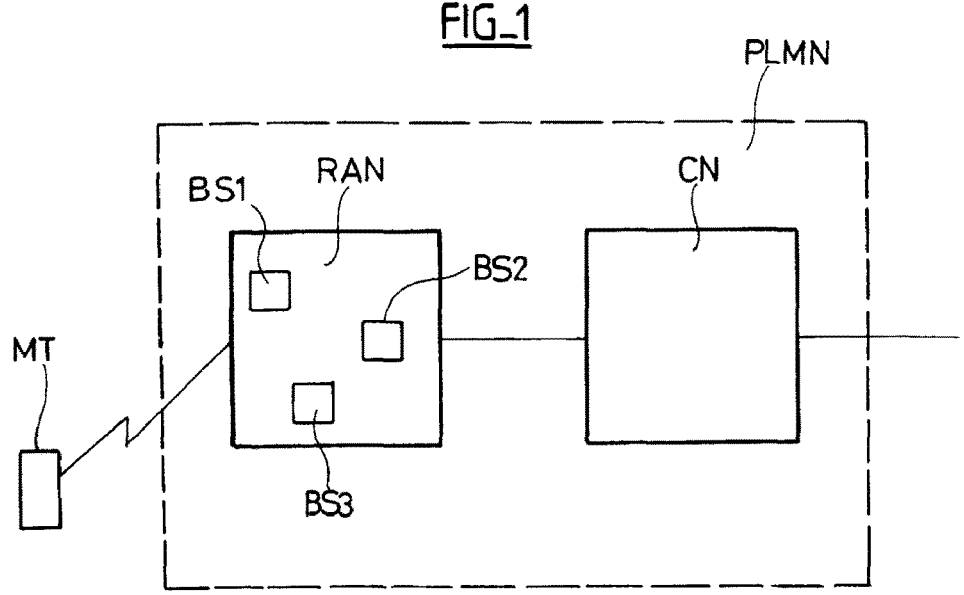
FIG_1
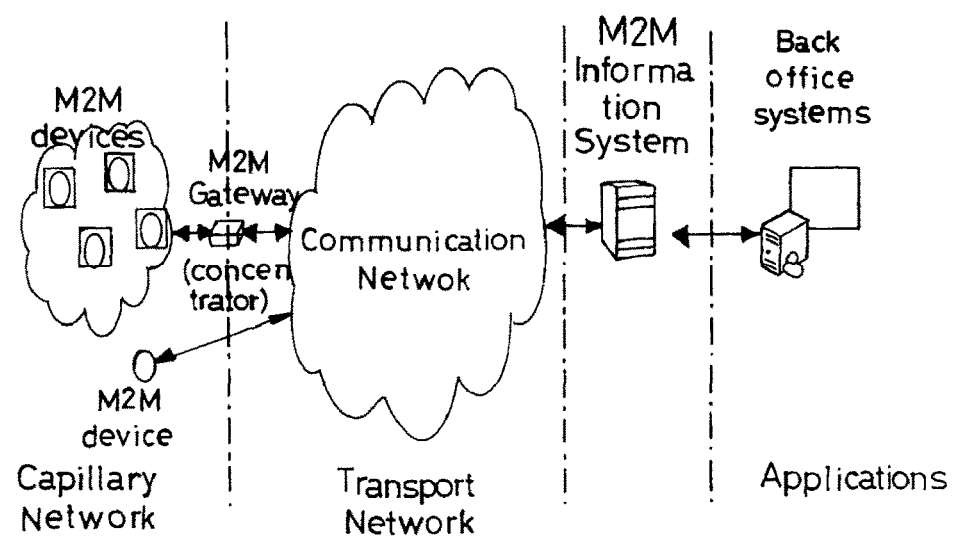
FIG_2

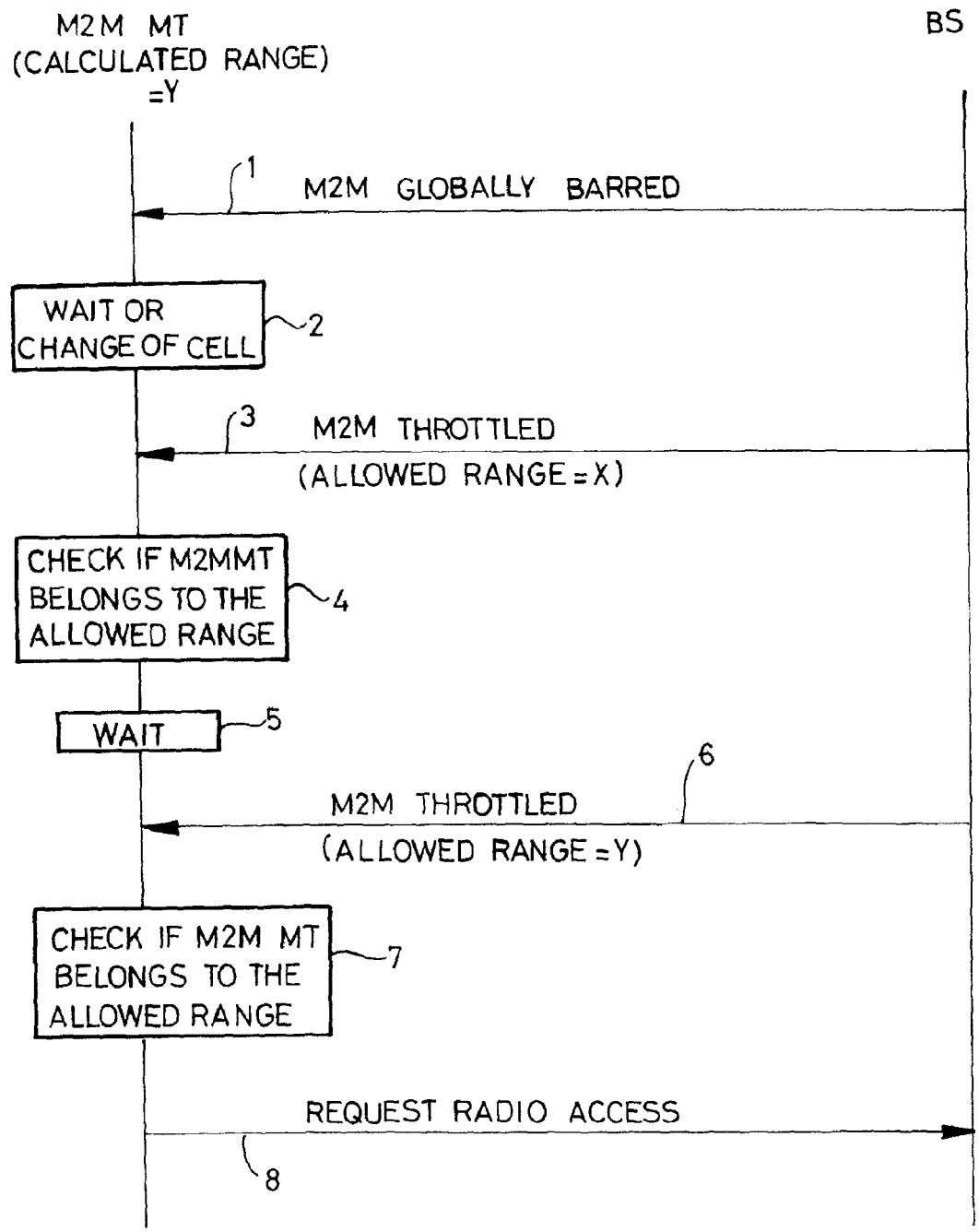

PREVENTION OF CONGESTION AT RADIO ACCESS IN A MOBILE OR WIRELESS COMMUNICATION SYSTEM

CROSS-REFERENCE TO RELATED APPLICATIONS

This application is based on European Patent Application No. 09305957.4 filed Oct. 8, 2009, the disclosure of which is hereby incorporated by reference thereto in its entirety, and the priority of which is hereby claimed under 35 U.S.C. §119.

FIELD OF THE INVENTION

The present invention generally relates to mobile or wireless communication networks and systems.

BACKGROUND

Generally, descriptions of mobile or wireless networks and systems can be found in the literature such as in particular in Technical Specifications published by standardisation bodies. Examples of standardisation bodies include 3GPP ($3^{rd}$ Generation Partnership Project), IEEE (Institute of Electrical and Electronics Engineers) . . . etc.

In the following, mobile networks and systems such as specified by standardization bodies such as for example 3GPP will mainly be considered, as an example to which embodiments of the present invention applies. However embodiments of the present invention are not limited to such example.

An example of a mobile communication system is recalled in FIG. 1. The mobile network may be a PLMN (Public Land Mobile Network) such as those supporting GSM, UMTS, LTE, CDMA, Wimax, etc. . . . technologies for public telecommunication but may also encompass satellites based networks.

As illustrated in FIG. 1, a Mobile Terminal MT has access via a Radio Access Network RAN to communication services provided by a Core Network CN. Examples of Radio Access Network (RAN) include GERAN (for 2G GSM/GPRS), UTRAN (for 3G UMTS), E-UTRAN (for 3G LTE), . . . etc. The RAN generally has a cellular architecture, therefore the RAN includes a plurality of network entities such as Base Stations (such as BS1, BS2, BS3). Examples of Base Stations include 2G BTS (Base Transceiver Station), 3G Node B. 3G LTE ENB (Evolved Node B), . . . etc.

SUMMARY

Historically mobile networks were mainly designed for enabling voice communication between human beings. Then some additional services were added, e.g. data service, SMS, . . . .

Currently, a new kind of communications is emerging: the Machine-to-Machine communication (M2M). In M2M, the communication is not between human beings but between two machines that doesn't need necessarily human interaction.

With the development of Machine to Machine (M2M) communications (e.g. captors, sensors, . . . ) huge amounts of new automatic M2M Mobile Terminals are going to be deployed.

As recognized by the inventors of the present application, as those M2M Mobile Terminals are not directly controlled by human beings, there is the risk that some automatic algorithm in the various M2M Mobile Terminals induce that they ask simultaneously for communication network resources. If (too) many of those terminals are deployed in the same radio cell, there is the risk that they simultaneously request radio resources inducing a congestion or overflow of radio resources and of radio base station resources. Actually the highest risk is that of an overflow of radio signaling capabilities and of Base Station signaling capability (CPU) as each of those M2M Mobile Terminals may not request a high radio throughput.

Currently this issue is not solved. Currently the M2M market is emerging. The number of M2M devices that are managed via a mobile network is currently not huge, but it is foreseen that in the next future some applications (e.g. Smart Metering) could have to manage several millions of new M2M devices.

Even before this massive deployment, this issue may arise at cell level. It locally a high number of M2M mobile devices is installed, the problem could appear in one cell.

Embodiments of the present invention in particular enables to solve such problems and/or avoid such drawbacks. More generally, it is an object of embodiments of the present invention to improve radio access, and finally quality of service, in a mobile or wireless communication system, particularly (though not exclusively) for M2M communication.

These and other objects are achieved, in one aspect, by a method for preventing congestion at radio access in a mobile or wireless communication system.

Said method comprises, in an embodiment, a step of:
barring a Mobile Terminal from radio access, except if said Mobile Terminal belongs to a given one of different ranges into which Mobile Terminals are split, said given range being referred to as allowed range, said allowed range changing upon time.

These and other objects are achieved in other aspects, by entities such as in particular Mobile Terminal (such as in particular M2M Mobile Terminal), and network entity (such as in particular Base Station), for carrying out such method.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 is intended to illustrate an example of a mobile communication system,

FIG. 2 is intended to illustrate a high level view of a M2M mobile communication system, FIG. 3 is intended to illustrate prevention of congestion according to an embodiment of the present invention.

DESCRIPTION OF EMBODIMENTS

From a high level point of view, a M2M system can generally be represented as illustrated in FIG. 2.

The Back Office systems contains the Applications that manage the M2M Devices and the data handled by them.

The M2M Information System is in charge to manage the communications with the M2M Devices via a specific Communication Network.

The Communication Network allows to transport data from/to Applications to/from M2M Devices or M2M Gateways. This network can be a public network (e.g. 3GPP, TISPAN, CDMA, . . . ) or any other kind of network (Ethernet, PLC, . . . ).

A M2M Gateway is a specific M2M network element that is in charge to manage some M2M Devices via a M2M capillary network. A lot of types of capillary network (wired or wireless) are currently existing depending on the kind of handled data, the kind of topology, topography, range, . . . . One of the main goals of a M2M Gateway is for example the aggregation of the data collected from the M2M Devices before sending them in a more concentrated way to the central Application.

A Back Office system can exchange messages with M2M Devices by using some specific protocols.

Some M2M Systems can handle a huge number of M2M Devices (for example in Smart Metering in which the M2M Application remotely collect the value of each M2M Device that are the electricity counters).

In the following a M2M Mobile Terminal may be
A M2M device accessing directly to the mobile network
A M2M Gateway that is in charge to manage some M2M Devices via a M2M capillary network and to support access to a mobile network on behalf of these M2M devices.

In order to solve the above-mentioned problems and/or avoid the above-mentioned drawbacks, an application level throttling mechanism could be foreseen where the application/M2M information system takes care that all the M2M devices it handles do not try to contact the application at the same time.

However, as further recognized by the inventors of the present application:

As there may be many simultaneous M2M applications, an application level throttling is likely not to be able to control the load in a given cell. (especially since some M2M Devices can move so it brings an additional level of complexity for an application level throttling)

Furthermore M2M devices may need to communicate with other entities that the M2M application (e.g. to communicate with a NW server for synchronization purposes). The (radio) network accesses of M2M devices may thus be independent from the M2M application and thus should be controlled at a lower layer.

In an embodiment of the present invention, it is proposed to:
split the M2M Mobile Terminals into sub-sets of terminals (M2M ranges of terminals) and to
bar any radio access from M2M Mobile Terminals except if they belong to a given M2M range and to
rotate (cycle) upon time the value of the range (of M2M terminals) that is allowed to have radio access on a given cell.

In other words, a radio access throttling is done at radio level (cell level) and is independent of the M2M application. It is independent from and has a different objective as any M2M related application level throttling that may be enforced at individual M2M application level between the M2M Information System and the M2M mobile terminals. The M2M application level throttling protects an individual application and is independent of where (cell) the M2M mobile terminal is camping.

Note that the wider the cell is (satellite cells, cells using a low frequency radio), the higher the need for a mechanism as proposed.

In the following a more detailed description of an embodiment of the present invention will be provided.

In an embodiment, the Radio Access Network (RAN) broadcasts in its beacon the following M2M related information 1. Whether M2M Mobile Terminals are allowed/throttled/globally barred in the cell
2. When M2M Mobile Terminals are throttled in the cell, the value of the M2M range currently allowed in the cell.

In an embodiment, when the M2M Mobile Terminals want to access to the Radio Access Network they may (as illustrated in FIG. 3):
1. check that the cell they are camping on is not globally barred for M2M service
2. If the cell is globally barred for M2M service (as illustrated at 1), look for another cell or wait for the M2M service to be no more globally barred in the current cell (as illustrated at 2)
3. If the cell is throttled for M2M service (as illustrated at 3), check whether they belong to the M2M range that is currently allowed in the cell (as illustrated at 4)
4. If they do not belong to the M2M range that is currently allowed (for example a M2M Mobile Terminal belonging to range Y whereas X is the currently allowed range as illustrated in FIG. 3), then wait for this range to be allowed (regularly scan the related cell beacon information), as illustrated at 5, or possibly look for another cell.
5. If the cell is globally allowed for M2M service, or if the M2M Mobile Terminal belongs to the M2M range that is currently allowed (as illustrated at 6 and 7), for example a M2M Mobile Terminal belonging to range Y and range Y being the currently allowed range as illustrated in FIG. 3, then request an access to the cell (as illustrated at 8).

In this example, the throttling mechanism is combined with a mechanism of global allowance/barring; however these are independent mechanisms, the throttling mechanism could be considered independently of the global allowance/barring mechanism and vice versa, another aspect of embodiments of the present invention being the global allowance/barring mechanism for M2M service in itself.

Various embodiments for implementing the throttling mechanism may be used, for example:
1. For a 3GPP M2M Mobile Terminal, the M2M range of the M2M Mobile Terminal may be determined based on a modulo operation on the last digits of the MSIN part of the IMSI of the M2M Mobile Terminal.
    IMSI means International Mobile Subscriber Identity. It is defined in 3GPP 23.003, composed by the 3 parts i.e. MCC+MNC+MSIN with:
    MCC=Mobile Country Code on 3 digits
    MNC=Mobile Network Code on 2 or 3 digits
    MSIN=Mobile Subscriber Identification Number on 10 digits.
    The last digits of the IMSI, or MSIN digits, are evenly distributed among terminals.
    In other words, in this example, a M2M Mobile Terminal may calculate the range R to which it belongs by performing a modulo operation, i.e. calculating the range R to which it belongs as the remainder after division of a number formed by last digits of the MSIN part of the IMSI, by a number associated with the modulo operation (or number of ranges).
2. For other M2M Mobile Terminals (such as for example IEEE M2M Mobile Terminals), the M2M range of a M2M Mobile Terminal may be determined based on a modulo operation (with the same principle as previously in 1) on the last (lower order) 24 bits of the MAC (Media Access Control) address of the terminal.
    The lower order bits of the MAC address are being used as these bits are evenly distributed among terminals 3. The value of the M2M range currently allowed in the cell may be broadcast together with a number associated with a modulo operation (or number of ranges) in turn associated with this M2M throttling mechanism (as described above). This allows the operator e.g. to control the number of ranges into which M2M Mobile Terminals are split, for example to control whether it splits the M2M Mobile Terminals into 8, 16, 32, . . . ranges. M2M related parameters such as the value of the M2M range currently allowed and/or a number enabling a M2M Mobile Terminal to calculate its range may be broadcast as system information on a broadcast channel such as for example Broadcast Control Channel BCCH.
4. The Throttling may apply only to the M2M Mobile Terminal initiated accesses, i.e. it may not apply when the M2M Mobile Terminal is being paged.
5. The application protocol may define "urgent" application messages that overcome this mechanism and that may be sent only in very specific (urgency) cases.

In one aspect, there is provided a method for preventing congestion at radio access in a mobile or wireless communication system.

In an embodiment, said method comprises a step of:
barring a Mobile Terminal from radio access, except if said Mobile Terminal belongs to a given one of different ranges into which Mobile Terminals are split, said given range being referred to as allowed range, said allowed range changing upon time.

In an embodiment, said method comprises a step of:
the network broadcasting information indicating the currently allowed range.

In an embodiment, said method comprises the steps of:
a Mobile Terminal checking whether it belongs to the currently allowed range,
the Mobile Terminal refraining from radio access if it does not belong to the currently allowed range.

In an embodiment, said method comprises a step of:
a Mobile Terminal calculating the range to which it belongs.

In an embodiment, said method comprises a step of:
a Mobile Terminal calculating the range to which it belongs by performing a modulo operation, said range corresponding to the remainder after division of a number associated with said Mobile Terminal by a number associated with said modulo operation, said number associated with said Mobile Terminal being such that numbers associated with Mobile Terminals are evenly distributed among Mobile Terminals.

In an embodiment, said method comprises a step of:
the network broadcasting information indicating a number associated with a modulo operation, said number associated with said modulo operation enabling a Mobile Terminal to determine the range to which it belongs by performing a modulo operation using said number associated with said modulo operation.

In an embodiment, said number associated with said Mobile Terminal includes last digits of the International Mobile Subscriber Identity IMSI.

In an embodiment, said number associated with said Mobile Terminal includes last digits of the Medium Access Control MAC address of the Mobile Terminal.

In an embodiment, said method comprises a step of:
in a cellular network, the network broadcasting in a given cell information indicating the currently allowed range in said cell.

In an embodiment, said method comprises the steps of, in a cellular network:
a Mobile Terminal checking whether it belongs to the currently allowed range in a given cell,
the Mobile Terminal refraining from radio access in said given cell if it does not belong to the range currently allowed in said given cell.

In an embodiment, said method comprises a step of:
in a cellular network, if a Mobile Terminal does not belong to a currently allowed range in a given cell, the Mobile Terminal waiting that it belongs to a currently allowed range in said cell, or looking for another cell such that the Mobile Terminal belongs to a currently allowed range in said other cell.

In an embodiment, said method comprises a step of:
in a cellular network, the network broadcasting in a given cell information indicating if the cell is globally barred for radio access.

In an embodiment, said method comprises a step of:
in a cellular network, a Mobile Terminal in a given cell which is globally barred waiting that the cell is no longer globally barred, or looking for another cell which is not globally barred.

In an embodiment, said Mobile Terminals comprise Machine-to-Machine M2M Mobile Terminals.

In other aspects, there are provided entities such as in particular Mobile Terminal (such as in particular M2M Mobile Terminal), and network entity (such as in particular Base Station), for carrying out such method.

There is provided a Mobile Terminal (such as in particular M2M Mobile Terminal).

In an embodiment, said Mobile Terminal comprises:
means for checking whether it belongs to a currently allowed range for radio access, said allowed range corresponding to a given one of different ranges into which Mobile Terminals are split, said allowed range changing upon time,
means for refraining from radio access if it does not belong to the currently allowed range.

In an embodiment, said Mobile Terminal comprises:
means for calculating the range to which it belongs.

In an embodiment, said Mobile Terminal comprises:
means for calculating the range to which it belongs by performing a modulo operation, said range corresponding to the remainder after division of a number associated with said Mobile Terminal by a number associated with said modulo operation, said number associated with said Mobile Terminal being such that numbers associated with Mobile Terminals are evenly distributed among Mobile Terminals.

In an embodiment, said number associated with said Mobile Terminal includes last digits of the International Mobile Subscriber Identity IMSI.

In an embodiment, said number associated with said Mobile Terminal includes last digits of the Medium Access Control MAC address of the Mobile Terminal.

In an embodiment, said Mobile Terminal comprises:
means for checking whether it belongs to the currently allowed range in a given cell of a cellular network,
means for refraining from radio access in said given cell if it does not belong to the range currently allowed in said given cell.

In an embodiment, said Mobile Terminal comprises:
means for, if said Mobile Terminal does not belong to a currently allowed range in a given cell of a cellular network, waiting that it belongs to a currently allowed range in said cell, or looking for another cell such that the Mobile Terminal belongs to a currently allowed range in said other cell.

In an embodiment, said Mobile Terminal comprises:

means for, in a given cell of a cellular network which is globally barred, waiting that the cell is no longer globally barred, or looking for another cell which is not globally barred.

There is also provided a wireless or mobile communication network entity (such as in particular Base Station).

In an embodiment, said network entity comprises:

means for broadcasting information indicating a currently allowed range for radio access, said allowed range corresponding to a given one of different ranges into which Mobile Terminals are split, said allowed range changing upon time.

In an embodiment, said network entity comprises:

means for broadcasting information enabling a Mobile Terminal to determine the range to which it belongs.

In an embodiment, said network entity comprises:

means for broadcasting information indicating a number associated with a modulo operation, said number associated with said modulo operation enabling a Mobile Terminal to determine the range to which it belongs by performing a modulo operation using said number associated with said modulo operation.

In an embodiment, said network entity comprises:

means for broadcasting, in a given cell of a cellular network, information indicating the currently allowed range in said cell.

In an embodiment, said network entity comprises:

means for broadcasting, in a given cell of a cellular network, information indicating if the cell is globally barred for radio access.

The detailed implementation of the above-mentioned means does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for preventing congestion at radio access in a cellular mobile communication system, said method comprising:

receiving information broadcast from a radio access network entity at a Mobile Terminal in a cellular mobile communication network, the information indicating a currently allowed range of different ranges into which Machine-to-Machine (M2M) Mobile Terminals operating in the cellular mobile communication network are split, wherein the radio access network entity changes the currently allowed range of the different ranges upon time, calculating a member range of the different ranges to which the Mobile Terminal belongs by performing a modulo operation, the member range corresponding to a remainder after division of an identifying number associated with the Mobile Terminal by a modulo number associated with the modulo operation, the identifying number associated with the Mobile Terminal being such that corresponding numbers associated with the M2M Mobile Terminals are evenly distributed among the M2M Mobile Terminals, checking whether the member range for the Mobile Terminal is the currently allowed range, refraining from initiating radio access to the cellular mobile communication network via the radio access network entity if the Mobile Terminal is an M2M Mobile Terminal and the member range for the Mobile Terminal is not the currently allowed range, and in case of messages defined as urgent, the Mobile Terminal carrying out radio access despite the member range for the Mobile Terminal not being the currently avowed range.

2. The method according to claim 1, further comprising:

if the M2M Mobile Terminal is barred from initiating radio access via the radio access network entity, waiting until the member range is no longer barred from initiating radio access via the radio access network entity, or looking for another network entity to which initiating radio access is not barred for the member range to which the M2M Mobile Terminal belongs.

3. The method according to claim 1, further comprising:

refraining from initiating radio access to the cellular mobile communication network via the radio access network entity if the information received in the broadcast indicates radio access for M2M service to the cellular mobile communication network via the radio access network entity is globally barred, or looking for another network entity to which radio access for M2M service is not barred for the member range to which the M2M Mobile Terminal belongs.

4. The method according to claim 1, wherein the identifying number associated with the Mobile Terminal includes last digits of an International Mobile Subscriber Identity (IMSI).

5. The method according to claim 1, wherein the identifying number associated with the Mobile Terminal includes last digits of a Medium Access Control (MAC) address of the Mobile Terminal.

6. The method according to claim 1, wherein the information received from the radio access network entity indicates the currently allowed range is for a cell formed by the radio access network entity;

wherein the checking includes checking whether the Mobile Terminal belongs to the currently allowed range for the cell;

wherein the refraining includes refraining from initiating radio access if the Mobile Terminal does not belong to the currently allowed range for the cell.

7. The method according to claim 1, wherein the information received from the radio access network entity includes the modulo number.

8. A Mobile Terminal, comprising:

at least one processor; and a transceiver;

wherein the at least one processor and the transceiver are configured to receive information broadcast from a radio access network entity in a cellular mobile communication network, the information indicating a currently allowed range of different ranges into which Machine-to-Machine (M2M) Mobile Terminals operating in the cellular mobile communication network are split, wherein the radio access network entity changes the currently allowed range of the different ranges upon time;

wherein the at least one processor and the transceiver are configured to calculate a member range of the different ranges to which the Mobile Terminal belongs by performing a modulo operation, the member range corresponding to a remainder after division of an identifying number associated with the Mobile Terminal by a modulo number associated with the modulo operation, the identifying number associated with the Mobile Terminal being such that corresponding numbers associated with the M2M Mobile Terminals are evenly distributed among the M2M Mobile Terminals, wherein the at least one processor and the transceiver are configured to check whether the member range for the Mobile Terminal is the currently allowed range;

wherein the at least one processor and the transceiver are configured to refrain from initiating radio access to said cellular mobile communication network via the radio access network entity if the Mobile Terminal is an M2M Mobile Terminal and the member range for the Mobile Terminal is not the currently allowed range, and wherein the at least one processor and the transceiver, in case of messages defined as urgent, are configured to carry out radio access despite the member range for the Mobile Terminal not being the currently allowed range.

9. The Mobile Terminal according to claim 8, wherein, if the M2M Mobile Terminal is barred from initiating radio access via the radio access network entity, the at least one processor and the transceiver are configured to waft until the member range is no longer barred from initiating radio access via the radio access network entity, or to look for another network entity to which initiating radio access is not barred for the member range to which the M2M Mobile Terminal belongs.

10. The Mobile Terminal according to claim 8, wherein the at least one processor and the transceiver are configured to refrain from initiating radio access to the cellular mobile communication network via the radio access network entity if the information received in the broadcast indicates radio access for M2M service to the cellular mobile communication network via the radio access network entity is globally barred, or to look for another network entity to which radio access for M2M service is not barred for the member range to which the M2M Mobile Terminal belongs.

11. The Mobile Terminal according to claim 8, wherein the identifying number associated with the Mobile Terminal includes last digits of an International Mobile Subscriber Identity (IMSI).

12. The Mobile Terminal according to claim 8, wherein the identifying number associated with the Mobile Terminal includes last digits of a Medium Access Control (MAC) address of the Mobile Terminal.

13. The Mobile Terminal according to claim 8, wherein the information received from the radio access network entity indicates the currently allowed range is for a cell formed by the radio access network entity;

wherein the at least one processor and the transceiver are configured to check whether the Mobile Terminal belongs to the currently allowed range for the cell;

wherein the at least one processor and the transceiver are configured to refrain from initiating radio access if the Mobile Terminal does not belong to the currently allowed range for the cell.

14. The Mobile Terminal according to claim 8, wherein the information received from the radio access network entity includes the modulo number.

15. A method for preventing congestion at radio access in a cellular mobile communication system, said method comprising:

broadcasting information from a radio access network entity operating in a cellular mobile communication network for reception by compatible Mobile Terminals within communication of the radio access network entity; the information indicating a currently allowed range of different ranges into which Machine-to-Machine (M2M) Mobile Terminals operating in the cellular mobile communication network are split; and changing the currently allowed range of the different ranges upon time;

wherein the information includes a modulo number that enables a Mobile Terminal receiving the broadcasted information to calculate a member range of the different ranges to which the Mobile Terminal belongs by performing a modulo operation, the member range corresponding to a remainder after division of an identifying number associated with the Mobile Terminal by the modulo number associated with the modulo operation, wherein the calculated member range enables the Mobile Terminal to check if it belongs to the currently allowed range;

wherein the Mobile Terminal is configured to refrain from initiating radio access to the cellular mobile communication network via the radio access network entity if the Mobile Terminal is an M2M Mobile Terminal and the member range for the Mobile Terminal is not the currently allowed range, wherein in case of messages defined as urgent, the Mobile Terminal is configured to carry out radio access despite the member range for the Mobile Terminal not being the currently allowed range.

16. The method according to claim 15, wherein the information broadcast from the radio access network entity indicates the currently allowed range is for a cell formed by the radio access network entity.

17. The method according to claim 15, wherein the information broadcast from the radio access network entity indicates access for M2M service to the cellular mobile communication network for a cell formed by the radio access network entity is globally barred for the different ranges.

18. The method according to claim 15, wherein the identifying number associated with the Mobile Terminal is such that corresponding numbers associated with the M2M Mobile Terminals are evenly distributed among the M2M Mobile Terminals.

19. A radio access network entity, comprising:

at least one processor;

and a transceiver;

wherein the at least one processor, and the transceiver are configured to broadcast information in a cellular mobile communication network for reception by compatible Mobile Terminals, the information indicating a currently allowed range of different ranges into which Machine-to-Machine (M2M) Mobile Terminals operating in the cellular mobile communication network are split;

wherein the at least one processor and the transceiver are configured to change the currently allowed range of the different ranges upon time;

wherein the information includes a modulo number that enables a Mobile Terminal receiving the broadcasted information to calculate a member range of the different ranges to which the Mobile Terminal belongs by performing a modulo operation, the member range corresponding to a remainder after division of an identifying number associated with the Mobile Terminal by the modulo number associated with the modulo operation, wherein the calculated member range enables the Mobile Terminal to check if it belongs to the currently allowed range;

wherein the Mobile Terminal is configured to refrain from radio access to the cellular mobile communication network via the radio access network entity if the Mobile Terminal is an M2M Mobile Terminal and the member range for the Mobile Terminal is not the currently allowed range, wherein in case of messages defined as urgent, the Mobile Terminal is configured to carry out radio access despite the member range for the Mobile Terminal not being the currently allowed range.

20. The radio access network entity according to claim 19, wherein the at least one processor and the transceiver are configured such that the information broadcast indicates the currently allowed range is for a cell formed by the radio access network entity.

21. The radio access network entity according to claim 19, wherein the at least one processor and the transceiver are configured such that the information broadcast indicates access for M2M service to the cellular mobile communication network for a cell formed by the radio access network entity is globally barred for the different ranges.

22. The radio access network entity according to claim 19, wherein the identifying number associated with the Mobile Terminal is such that corresponding numbers associated with the M2M Mobile Terminals are evenly distributed among the M2M Mobile Terminals.

* * * * *